United States Patent
An et al.

(10) Patent No.: US 9,729,879 B2
(45) Date of Patent: Aug. 8, 2017

(54) METHOD AND APPARATUS OF DEBLOCKING FILTER

(75) Inventors: Jicheng An, Beijing (CN); Xun Guo, Beijing (CN); Qian Huang, Beijing (CN); Shaw-Min Lei, Hsinchu (TW)

(73) Assignee: HFI INNOVATION INC., Zhubei, Hsinchu County (TW)

(*) Notice: Subject to any disclaimer, the term of this patent is extended or adjusted under 35 U.S.C. 154(b) by 950 days.

(21) Appl. No.: 13/993,063

(22) PCT Filed: Mar. 6, 2012

(86) PCT No.: PCT/CN2012/071977
§ 371 (c)(1),
(2), (4) Date: Jun. 10, 2013

(87) PCT Pub. No.: WO2012/119540
PCT Pub. Date: Sep. 13, 2012

(65) Prior Publication Data
US 2013/0266061 A1   Oct. 10, 2013

Related U.S. Application Data
(60) Provisional application No. 61/451,289, filed on Mar. 10, 2011.

(51) Int. Cl.
*H04N 7/26* (2006.01)
*H04N 7/50* (2006.01)
(Continued)

(52) U.S. Cl.
CPC .......... *H04N 19/117* (2014.11); *H04N 19/14* (2014.11); *H04N 19/176* (2014.11); *H04N 19/86* (2014.11)

(58) Field of Classification Search
CPC .... G06K 9/30–9/40; H04N 7/12; H04N 11/02
See application file for complete search history.

(56) References Cited

U.S. PATENT DOCUMENTS
| | | | |
|---|---|---|---|
| 7,319,415 B2 | 1/2008 | Gomila | |
| 2003/0206664 A1* | 11/2003 | Gomila | H04N 19/176 382/268 |

(Continued)

FOREIGN PATENT DOCUMENTS
| | | |
|---|---|---|
| CN | 1659794 | 8/2005 |
| CN | 101321277 A | 12/2008 |

(Continued)

OTHER PUBLICATIONS
An, et al.; "CE8 subtest1 Improved deblocking filter;" Joint Collaborative team on Video Coding (JCT-VC) of ITU-T SG16 WP3 and ISO/IEC JTC1/SC29/WG11; Jan. 2011; pp. 1-10.

*Primary Examiner* — Behrooz Senfi
*Assistant Examiner* — Maryam Nasri
(74) *Attorney, Agent, or Firm* — McClure, Qualey & Rodack, LLP

(57) ABSTRACT

A method and apparatus for improved deblocking filter are disclosed. In one embodiment according to the present invention, determining the non-zero transform coefficients existence for a PU-only boundary is skipped and therefore the deblocking filter for PU-only boundary is eliminated if the condition of boundary strength equal to 1 is not fulfilled to avoid unnecessary deblocking. In another embodiment of the present invention, three gradients are determined for two pixel lines and filter ON/OFF decision is made based on the three gradient values of the two pixel lines. One aspect of the invention is related to filter strength selection between strong and weak filters. According to one embodiment, the filter strength selection is based on various gradient values of a pixel line across the block boundary. Another aspect of the invention is related to the weak filter.

3 Claims, 2 Drawing Sheets

(51) Int. Cl.
  *H04N 19/18* (2014.01)
  *H04N 19/117* (2014.01)
  *H04N 19/176* (2014.01)
  *H04N 19/14* (2014.01)
  *H04N 19/86* (2014.01)

(56) References Cited

U.S. PATENT DOCUMENTS

| | | | |
|---|---|---|---|
| 2005/0013494 A1 | 1/2005 | Srinivasan et al. | |
| 2007/0154090 A1 | 7/2007 | Howard | |
| 2012/0106649 A1* | 5/2012 | Wang | H04N 19/159 375/240.18 |
| 2013/0101024 A1* | 4/2013 | Van der Auwera | H04N 19/117 375/240.03 |
| 2013/0101031 A1* | 4/2013 | Van der Auwera | H04N 19/14 375/240.12 |

FOREIGN PATENT DOCUMENTS

| | | |
|---|---|---|
| CN | 101472172 A | 7/2009 |
| WO | 02096117 A1 | 11/2002 |

* cited by examiner

| QP | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| $\alpha_i$ | 0 | 0 | 0 | 0 | 0 | 0 | 0 | 0 | 0 | 0 | 0 | 0 | 0 | 0 | 0 | 0 | 4 | 4 |
| $\beta_i$ | 0 | 0 | 0 | 0 | 0 | 0 | 0 | 0 | 0 | 0 | 0 | 0 | 0 | 0 | 0 | 0 | 2 | 2 |
| $tc$ | 0 | 0 | 0 | 0 | 0 | 0 | 0 | 0 | 0 | 0 | 0 | 0 | 0 | 0 | 0 | 0 | 0 | 0 |
| QP | 18 | 19 | 20 | 21 | 22 | 23 | 24 | 25 | 26 | 27 | 28 | 29 | 30 | 31 | 32 | 33 | 34 | 35 |
| $\alpha_i$ | 5 | 6 | 7 | 8 | 9 | 10 | 12 | 13 | 15 | 17 | 20 | 22 | 25 | 28 | 32 | 36 | 40 | 45 |
| $\beta_i$ | 2 | 3 | 3 | 3 | 3 | 4 | 4 | 4 | 6 | 6 | 7 | 7 | 8 | 8 | 9 | 9 | 10 | 10 |
| $tc$ | 0 | 0 | 1 | 1 | 1 | 1 | 1 | 1 | 1 | 2 | 2 | 2 | 2 | 3 | 3 | 3 | 4 | 4 |
| QP | 36 | 37 | 38 | 39 | 40 | 41 | 42 | 43 | 44 | 45 | 46 | 47 | 48 | 49 | 50 | 51 | | |
| $\alpha_i$ | 50 | 56 | 63 | 71 | 80 | 90 | 101 | 113 | 127 | 144 | 162 | 182 | 203 | 226 | 255 | 255 | | |
| $\beta_i$ | 11 | 11 | 12 | 12 | 13 | 13 | 14 | 14 | 15 | 15 | 16 | 16 | 17 | 17 | 18 | 18 | | |
| $tc$ | 4 | 5 | 5 | 5 | 6 | 6 | 7 | 8 | 9 | 10 | 11 | 12 | 13 | 14 | 15 | 16 | | |

Fig. 2

METHOD AND APPARATUS OF DEBLOCKING FILTER

CROSS REFERENCE TO RELATED APPLICATIONS

The present invention claims priority to U.S. Provisional Patent Application Ser. No. 61/451,289, filed Mar. 10, 2011, entitled "Improved Deblocking Filter". The U.S. Provisional Patent Applications is hereby incorporated by reference in its entirety.

FIELD OF INVENTION

The present invention relates to video coding. In particular, the present invention relates to the deblocking filter.

BACKGROUND OF THE INVENTION

Motion compensated transform coding has been widely adopted in various coding standards, where block transform is applied to motion-compensated residues. The motion compensated inter-frame coding system also uses intra-frame mode periodically or adaptively. During the coding process, transform coefficients are quantized in order to reduce bitrate and consequently artifacts are introduced. The artifacts are more visible at boundaries around transform blocks. In order to alleviate the coding artifacts, a technique called deblocking has been developed which applied filtering across block boundaries adaptively. The deblocking technique is also called deblocking filter in the field of video coding.

While the conventional deblocking filter has shown to reduce coding artifacts, the process might have been applied unnecessarily in some circumstances. Furthermore, the deblocking filter may be designed with characteristics to improve performance. Accordingly, it is desirable to design a new deblocking filter to avoid applying deblocking filter unnecessarily and consequently to deliver improved performance.

SUMMARY OF THE INVENTION

A method and apparatus for deblocking of reconstructed video in a video coding system are disclosed. In one embodiment according to the present invention, the method and apparatus for deblocking of reconstructed video in a video coding system skip determining the non-zero transform coefficients existence for a PU-only boundary. The method may assign smaller block strength to the PU-only boundary. Zero-valued block strength is used to disable deblocking for to the PU-only boundary. In another embodiment of the present invention, three gradients are determined for two pixel lines and filter ON/OFF decision is made based on the three gradients of the two pixel lines. The absolute values of the gradients are compared with respective thresholds and the results are used to determine filter ON/OFF. One aspect of the invention is related to filter strength selection between strong and weak filters. In one embodiment of the present invention, the strength selection is based on the gradient between two first boundary pixels across the block boundary, three gradients associated with the first and the second boundary pixels, the first and the third boundary pixels, and the first and the fourth boundary pixels on one side of the block boundary, and respective three gradients on the other side of the block boundary. Another aspect of the invention is related to the weak filter. In order to preserve edge sharpness when the weak filter is selected, one embodiment according to the present invention conditionally applies the weak filter to the second boundary pixel on each side of the block boundary. The condition is based on the gradient between the first and the third boundary pixels on each side of the block boundary.

BRIEF DESCRIPTION OF THE DRAWINGS

FIG. 2 illustrates an example of dependence of thresholds $\alpha_i$ and $\beta_i$ and clipping variable tc on quantization parameter (QP).

DETAILED DESCRIPTION

Figure 1:
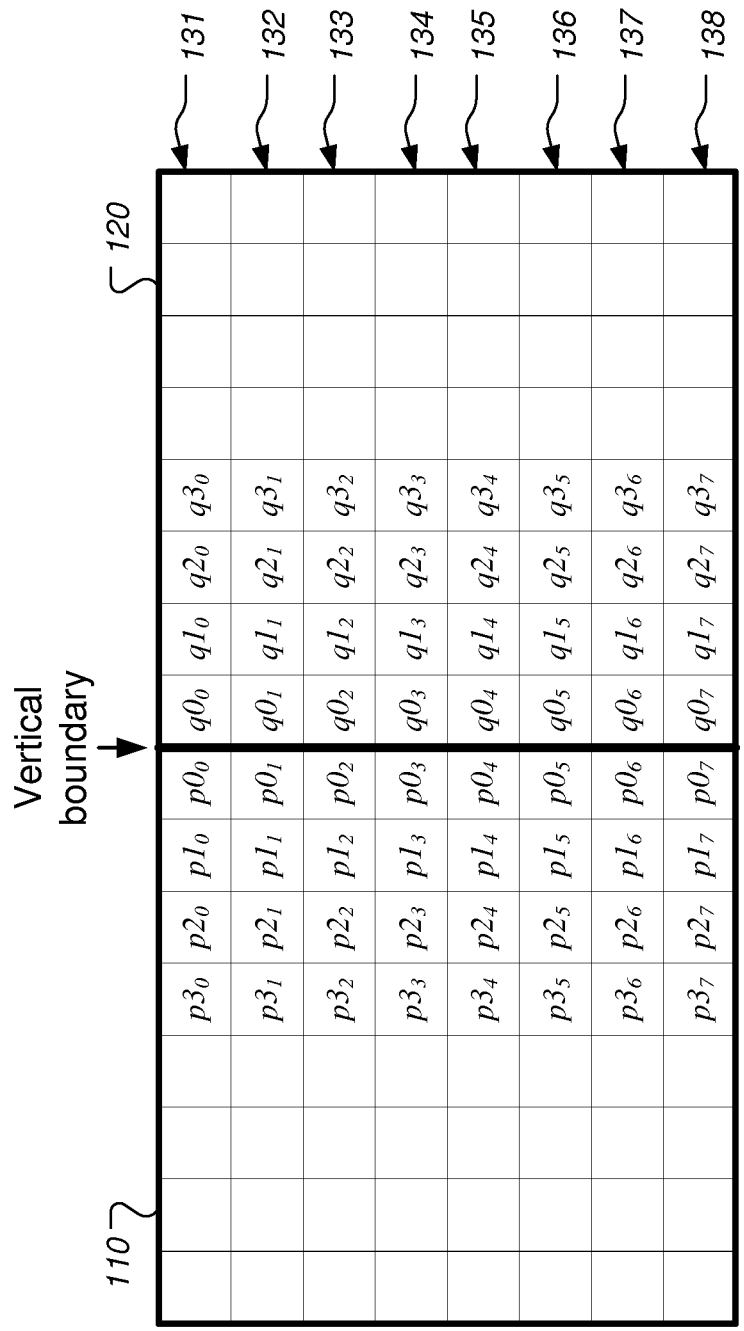
FIG. 1 illustrates an exemplary vertical block boundary between two neighboring blocks and pixel lines across the boundary.

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations such as quantization. The coding artifacts may become noticeable in the reconstructed video data, especially at or near block boundaries of block-based transform. In order to alleviate the visibility of coding artifacts, a technique called deblocking has been used in newer coding systems such as H.264/AVC and the High Efficiency Video Coding (HEVC) system being developed. Furthermore, HEVC adopts a separate unit for block-based prediction, named prediction unit (PU), which may be different from the transform unit (TU). Consequently, the boundaries of PUs may not be aligned with the boundaries of TUs. In HEVC, the deblocking process is based on 8×8 block for both luma and chroma components.

FIG. 1 shows an example of a vertical boundary to be filtered between two block A 110 and block B 120 shown as thick boxes in FIG. 1, where each block consists of 8×8 pixels. Eight pixel lines associated with the two neighboring blocks are labeled from 131 through 138 as shown in FIG. 1. Four pixels on each side of the vertical boundary are labeled as ($p3_i$, $p2_i$, $p1_i$, $p0_i$, $q0_i$, $q1_i$, $q2_i$, $q3_i$), where i the index for the pixel lines and i=0, . . . , 7. Pixels immediately next to the block boundary, i.e., $p0_i$ and $q0_i$, are named first boundary pixels. Similarly, $p1_i$ and $q1_i$ are named second boundary pixels, $p2_i$ and $q2_i$ are named third boundary pixels and $p3_i$ and $q3_i$ are named fourth boundary pixels. In this example, block A 110 and block B 120 can be two PUs or TUs. The deblocking process includes steps of determining filter ON/OFF, determining filter strength and applying deblocking filter. The filter ON/OFF decision checks if the transition at the boundary is a natural edge or is caused by coding artifacts. If it is a natural edge, the filter is turned OFF to preserve the sharpness of the picture associated with the respective boundary. Otherwise, the deblocking filter is turned ON to reduce the artifacts. The filter ON/OFF decision is first performed for all block boundaries of the respective picture area to be filtered. If a boundary is to be filtered, filter strength decision, i.e., selecting a strong or weak filter, will be determined. Subsequently, a deblocking filter with the determined filter strength is applied to the boundary to be filtered. The deblocking process is termed as deblocking for convenience in this disclosure. The deblocking process is also called deblocking filter in the field of video coding. The filter used for deblocking is also called deblocking filter. Therefore, the term deblocking filter may refer to the deblocking process or the filter used for deblocking depending on the context.

In order to keep the computational complexity low, the filter ON/OFF decision according to conventional HEVC is determined based on only two pixel lines. For example, in HM-3.0, line 2 and line 5 are used. Edge activity measure, d is computed based on pixels in lines 2 and 5:

$$d=|p2_2-2p1_2+p0_2|+|q2_2-2q1_2+q0_2|+|p2_5-2p1_5+p0_5|+|q2_5-2q1_5+q0_5|. \quad (1)$$

If the Edge activity measure d is smaller than a pre-defined threshold β, the corresponding block boundary will be filtered. The pre-defined threshold, β is related to quantization parameter (QP). If a block boundary is determined to be filtered, the weak/strong filter decision is then performed line by line according to the conditions:

$$d<\beta>>2, \quad (2)$$

$$|p3_i-p0_i|+|q3_i-q0_i|<\beta>>3, \text{ and} \quad (3)$$

$$|p0_i-q0_i|<5 \cdot tc+1, \quad (4)$$

where tc is another pre-defined threshold related to QP, which is used to avoid over-filtering pixels. If all three conditions above are satisfied, a strong filer is selected. Otherwise a weak filter is selected.

The deblocking filter for chroma components is similar to that for the luma component, but it is only used for intra block boundaries. Although deblocking filter used in conventional HEVC has the advantage of low complexity, performance could be improved. For example, the filter ON/OFF decision based on a single edge activity measurement d and a single threshold β may not lead to proper edge activity measure. Furthermore, the filter strength decision based on the gradients between the fourth boundary pixel (p3/q3) and the first pixel (p0/q0) may not properly reflect the true edge gradients. Moreover, the boundary strength (BS) derivation and weak filter operation also need to be refined accordingly. In conventional HEVC, deblocking filter is considered for a block boundary if one of the two neighboring blocks has non-zero transform coefficients. The above decision is made regardless whether the boundary is a PU boundary or a TU boundary. The above deblocking filter practice is inherited from the H.264 standard, where the transform size is always equal to or smaller than the prediction partition size. Furthermore, deblocking filter is applied to a boundary if the boundary strength is greater than 0, and deblocking filter is disabled when the boundary strength is 0. The boundary strength assignment according to HEVC Test Model version 3.0 (HM-3.0) is shown in Table 1.

TABLE 1

| Block modes and conditions | Boundary strength (BS) |
|---|---|
| One of the blocks is Intra | 3 or 4 |
| One of the blocks has non-zero transform coefficients | 2 |
| Difference of block motion vector >=1 integer luma sample distance | 1 |
| Motion compensation from different reference frames | 1 |
| Else | 0 |

According to Table 1, the boundary strength is 3 or 4 when the prediction mode of at least one of the blocks is intra mode depending on whether the boundary is the largest coding unit (LCU) boundary or not, and the boundary strength is 2 when at least one of the blocks has non-zero transform coefficients. The boundary strength assignment further checks if the blocks use different reference frames or different number of motion vectors. In HM-3.0, a TU may cover several PUs so that a PU boundary may not be always a TU boundary. As shown in Table 1, a PU-only boundary (inside one TU) will have a BS value equal to 2 if one of the blocks has non-zero transform coefficients. Accordingly, deblocking filter with BS equal to 2 will be applied to the PU-only boundary, which is not desirable since there are no block-based transform artifacts. Accordingly, an embodiment of the present invention skips determining the non-zero transform coefficients existence for PU-only boundary, and therefore eliminates deblocking filter for PU-only boundary by lowering the boundary strength to 0 if other conditions of BS equal to 1, i.e. motion vector difference and reference frames, are not fulfilled, while the HM-3.0 assigns boundary strength (BS) to 2 for the PU-only luma boundary having non-zero transform coefficients for one of the two neighboring blocks. The boundary strength assignment according to an embodiment of the present invention is shown in Table 2.

TABLE 2

| Block modes and conditions | Boundary strength (BS) |
|---|---|
| One of the blocks is Intra | 3 or 4 |
| The boundary is a TU boundary and one of the blocks has non-zero transform coefficients | 2 |
| Difference of block motion vector >=1 integer luma sample distance | 1 |
| Motion compensation from different reference frames | 1 |
| Else | 0 |

In recent HM-6.0, the BS value assignment is further cleaned up, in which only 3 BS values, i.e. 0, 1 and 2, are used. Therefore, the invention could also been changed accordingly. Compared to Table 2, BS value is changed to 2 when the prediction mode of at least one of the blocks is intra mode, and BS value is changed to 1 when the boundary is TU boundary and at least one of the blocks has non-zero transform coefficients. In this case, the PU-only boundary is still not filtered if the conditions of motion vector difference and reference frames are not fulfilled.

One aspect of the present invention addresses deblocking filter decisions. In one embodiment according to the present invention, the filter ON/OFF decision is based on the following conditions:

$$|p0_i-q0_i|<T\alpha, \quad (5)$$

$$|p1_i-p0_i|<T\beta, \text{ and} \quad (6)$$

$$|q1_i-q0_i|<T\beta, \quad (7)$$

where thresholds α and β are derived according to:

$$\alpha = \begin{cases} (5\alpha_i + 2) >> 2, & \text{if } A \text{ or } B \text{ is intra} \\ \alpha_i, & \text{otherwise,} \end{cases} \quad (8)$$

$$\beta = \begin{cases} \beta_i << 2, & \text{if } A \text{ or } B \text{ is intra} \\ \beta_i << 1, & \text{otherwise,} \end{cases} \quad (9)$$

where $\alpha_i$ and $\beta_i$ are dependent on QP of luma as shown in FIG. 2. The block boundary (8 pixel lines) will be filtered if equations (5), (6) and (7) are all satisfied for both i=2 and 5. In this embodiment, pixel data associated with a pixel line across a block boundary between a first block and a second block are received to determine a first gradient as shown in equation (5), a second gradient as shown in equation (6), and a third gradient as shown in equation (7), for the pixel line. The first gradient is measured between a first boundary pixel of the first block and a first boundary pixel of the second block. The second gradient is measured between a second boundary pixel of the first block and the first boundary pixel of the second block. The third gradient is measured between the first boundary pixel of the first block and the second boundary pixel of the second block. Pixel data associated with another pixel line across the same block boundary are also received to determine the first, second, and third gradients for the pixel line. In this embodiment, the two pixel lines are line 2 and line 5. The filter ON/OFF decision is determined based on the three gradients for line 2 and the three gradients for line 5, that is, the block boundary (8 pixel lines) will be filtered if equations (5), (6) and (7) are all satisfied for both pixel lines After the filter ON/OFF decision is made for the block boundary between blocks A and B is determined, one of the two filters (i.e., weak or strong filter) will be selected for each pixel line if the filter is determined to be ON for the block boundary. An embodiment according to the present invention uses more gradients between different pixel positions to provide better measurement of edge gradients, where the edge gradients are measured according to:

$$|p0_i - q0_i| < (\alpha >> 2) - (\alpha >> 4), \text{ and} \quad (10)$$

$$|q1_i - q0_i| + |q2_i - q0_i| + |q3_i - q0_i| + |p1_i - p0_i| + |p2_i - p0_i| + |p3_i - p0_i| < ((\beta_i - 4) << 2). \quad (11)$$

For each pixel line, the strong filter is selected if both conditions in equations (10) and (11) are satisfied. Otherwise, the weak filter is selected. Specifically, pixel data associated with a pixel line across a block boundary between a first block and a second block are received. A first gradient for the pixel line is measured between a first boundary pixel of the first block and a first boundary pixel of the second block, as shown in equation (10). A second gradient, a third gradient, and a fourth gradient for the pixel line in the first block are also determined. The second gradient is measured between the first boundary pixel and a second boundary pixel of the first block; the third gradient is measured between the first boundary pixel and a third boundary pixel of the first block; and the fourth gradient is measured between the first boundary pixel and a fourth boundary pixel of the first block. Similarly, the second gradient, the third gradient, and the fourth gradient for the pixel line in the second block are also determined. The filter strength for the block boundary is determined according to the second gradient, the third gradient and the fourth gradient of the first block, the second gradient, the third gradient and the fourth gradient of the second block, and the first gradient. For example, these gradients are compared with thresholds to decide the filter strength, and deblocking filter is applied to the block boundary according to the filter strength.

Another aspect of the present invention addresses weak filter design. In HM-3.0, the luma weak filter is always applied to the second boundary pixels (i.e., p1 and q1). In order to avoid damaging the edge cross the second boundary pixel, an embodiment according to the present invention performs the weak filter conditionally. A test is performed to determine whether the pixel should be filtered or not. Furthermore, a weak filter with modified coefficients is used according to the present invention. Specifically, the filtered values of p0' and q0' are calculated according to:

$$\Delta_0 = \text{clip}(-tc, tc, (12(q0 - p0) - 3(q1 - p1) + 16) >> 5), \quad (12)$$

$$p0' = p0 + \Delta_0, \text{ and} \quad (13)$$

$$q0' = q0 - \Delta_0. \quad (14)$$

The value of p1 is modified only if the condition, $$|p0 - p2| < \beta_i - 4, \quad (15)$$

is true and the filtered value p1' of p1 is calculated according to:

$$\Delta_{p1} = \text{clip}(-tc, tc, (12(p0 - p1) - 3(q0 - p2) + 16) >> 5), \text{ and} \quad (16)$$

$$p1' = p1 + (\Delta_{p1} >> 1). \quad (17)$$

Similarly, the value of q1 is modified only if the condition, $$|q0 - q2| < \beta_i - 4, \quad (18)$$

is true and the filtered value q1' of q1 is calculated according to:

$$\Delta_{q1} = \text{clip}(-tc, tc, (12(q0 - q1) - 3(p0 - q2) + 16) >> 5), \text{ and} \quad (19)$$

$$q1' = q1 + (\Delta_{q1} >> 1), \quad (20)$$

where the clipping variable tc can be found in FIG. 2.

In conventional HEVC, a single adjustment value $\Delta$ is used to derive filtered values p0', q0', p1' and q1'. According to an embodiment of the present invention, $\Delta_0$, $\Delta_{p1}$, and $\Delta_{q1}$ are calculated separately using three short-tap filters defined in (12), (16), and (19). The individual adjustment values, $\Delta_0$, $\Delta_{p1}$, and $\Delta_{q1}$ can lead to better filter result since the weak deblocking filter according to the present invention will be able to tailor to the individual characteristics of the pixels. In addition, p0', q0', p1' and q1' are derived based on the same formula with different parameters. Therefore, the weak filter may be implemented with the same logic and the hardware complexity is reduced.

In the above disclosure, derivation of filter ON/OFF decision, filter strength decision and weak filter modification are illustrated for a vertical block boundary. Derivation for a horizontal boundary can be done similarly. The deblocking technique according to the present invention can be applied to the luma component as well as the chroma components.

Embodiment of video systems incorporating encoding or decoding of deblocking filter according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deblocking of reconstructed video in a video coding system, wherein said deblocking is adaptively applied to block boundaries of the reconstructed video, and each block corresponds to a prediction unit (PU) or a transform unit (TU), the method comprising:
receiving pixel data associated with a block boundary between two blocks;
determining if the block boundary is a PU-only boundary between two PUs and not between two TUs or if the block boundary is a TU boundary between two TUs;
determining if one of the two blocks has non-zero transform coefficients only if the block boundary is the TU boundary, wherein determining if one of the two blocks has non-zero transform coefficients is skipped if the block boundary is the PU-only boundary;
assigning a first value to block strength for the block boundary if one of the two blocks has non-zero transform coefficients and the block boundary is the TU boundary;
assigning a second value to the block strength for the block boundary if the block boundary is the PU-only boundary, wherein the second value is smaller than or equal to the first value; and
applying said deblocking to the block boundary according to the block strength, and wherein filter strength of said deblocking is related to the block strength.

2. The method of claim 1, wherein the second value is zero when a predetermined criterion is fulfilled, and said deblocking is not applied to the block boundary.

3. An apparatus of deblocking of reconstructed video in a video coding system, wherein said deblocking is adaptively applied to block boundaries of the reconstructed video, and each block corresponds to a prediction unit (PU) or a transform unit (TU), the apparatus comprising:
a processor; and
at least one circuit configured for:
receiving pixel data associated with a block boundary between two blocks; determining if the block boundary is a PU-only boundary between two PUs and not between two TUs or if the block boundary is a TU boundary between two TUs;
determining if one of the two blocks has non-zero transform coefficients only if the block boundary is the TU boundary, wherein determining if one of the two blocks has non-zero transform coefficients is skipped if the block boundary is the PU-only boundary;
assigning a first value to block strength for the block boundary if one of the two blocks has non-zero transform coefficients and the block boundary is the TU boundary;
assigning a second value to the block strength for the block boundary if the block boundary is the PU-only boundary, wherein the second value is smaller than or equal to the first value; and
applying said deblocking to the block boundary according to the block strength, and wherein filter strength of said deblocking is related to the block strength.

\* \* \* \* \*